United States Patent [19]

Nagasawa et al.

[11] Patent Number: 5,618,898

[45] Date of Patent: Apr. 8, 1997

[54] WEATHER-RESISTANT SOLVENT-BASED COATING OBTAINED BY POLYMERIZATION WITH THIOETHER BOND CONVERTED TO SULFONE BOND

[75] Inventors: Mitsuru Nagasawa, Nagoya; Kazuyuki Kuwano; Takeshi Kawakami, both of Toyota; Mamoru Sugiura, Aichi-ken; Hiroshi Hibino, Nagoya; Shiro Kojima, Tokai; Kishiro Azuma, Tokyo, all of Japan

[73] Assignees: Toagosei Chemical Industry Co., Ltd., Tokyo; Toyota Jidosha Kabushiki Kaisha, Toyota; Toyota Technological Institute, Nagoya, all of Japan

[21] Appl. No.: 318,523

[22] Filed: Oct. 5, 1994

Related U.S. Application Data

[62] Division of Ser. No. 15,162, Feb. 9, 1993, abandoned.

[30] Foreign Application Priority Data

Feb. 10, 1992 [JP] Japan ..................... 4-023973
Nov. 13, 1992 [JP] Japan ..................... 4-303825
Dec. 21, 1992 [JP] Japan ..................... 4-357201

[51] Int. Cl.$^6$ ................ C08F 20/24; C08F 20/26; C08F 8/06
[52] U.S. Cl. ............ 526/245; 428/411.1; 524/547; 525/386; 525/387; 525/388; 526/214; 526/224; 526/279; 526/303.1; 526/318.44; 526/304; 526/320; 526/273; 526/329.7

[58] Field of Search ................. 526/214, 224, 526/245, 291, 276, 285, 288, 286, 293, 304, 296, 303.1, 308, 320, 271, 273, 279, 329.7, 318.44

[56] References Cited

U.S. PATENT DOCUMENTS 5,082,759  1/1992  Kato ........................ 526/286

FOREIGN PATENT DOCUMENTS

| 0096459 | 4/1983 | European Pat. Off. . |
| 60-133007 | 7/1985 | Japan . |
| 4-103610 | 4/1992 | Japan . |
| 1096912 | 1/1967 | United Kingdom . |
| 1283087 | 11/1969 | United Kingdom . |
| 1526301 | 7/1975 | United Kingdom . |
| 2142637 | 1/1985 | United Kingdom . |

OTHER PUBLICATIONS

EP 0 029 970 Jun. 1981.
Roel Buter "Low Molecular Weight Acrylic Resins for High Solids Automotive Topcoats", Journal of Coatings Technology, vol. 59, No. 749, Jun. 1987, pp. 37–41.

*Primary Examiner*—Christopher Henderson
*Attorney, Agent, or Firm*—Browdy and Neimark

[57] ABSTRACT

A process for producing a polymer of excellent weatherability, which comprises reacting a polymer having a thioether bond, with a peroxide to oxidize the sulfur atom in the bond to convert it into a sulfone.

3 Claims, No Drawings

WEATHER-RESISTANT SOLVENT-BASED COATING OBTAINED BY POLYMERIZATION WITH THIOETHER BOND CONVERTED TO SULFONE BOND

CROSS REFERENCE TO RELATED APPLICATION

This is a division of application Ser. No. 09/015,162, filed Feb. 9, 1993, now abandoned.

FIELD OF INVENTION

The present invention relates to a process for producing a (meth)acrylic acid ester type polymer of excellent weatherability, suitable for use in coatings, paints, etc. A coating composition containing, as a main component, a polymer obtained by the present process is suitable for coating of metals, plastics, wood, etc., particularly coating of automobiles and household electric appliances.

BACKGROUND OF INVENTION

Organic solvent-based acrylic coatings have generally been used for coating of automobiles, household electric appliances, etc. because of their excellency in weatherability and appearance. Recently, however, it has become a task of the coating industry from the standpoint of environmental protection to allow organic solvent-based acrylic coatings to have a high solid content.

The high solid content can be achieved by means of decreasing the molecular weight of a resin used in coatings. For example, Journal of Coating Technology Vol. 59, No. 749, Jun. 1987 proposes using in high solid coatings a polymer of 650–3,100 in number-average molecular weight obtained by copolymerizing an alkyl acrylate, styrene, acrylic acid, etc. in the presence of 3-mercaptopropionic acid.

Other methods for achieving the high solid content include using a branched-chain polymer as a resin for coating, and there has been proposed the following branched-chain polymer, for example.

That is, according to Japanese Patent Application Kokai No. 4-103610, a branched-chain polymer obtained by copolymerizing a radical-polymerizable macromolecular monomer containing, as the skeleton, a polymer obtained by radical polymerization of an alkyl (meth)acrylate, etc. in the presence of a mercaptan, with another monomer, gives a low-viscosity solution even at a high solid content and is therefore suitable as a resin for high-solid coating.

A representative process for synthesis of the above radical-polymerizable macromolecular monomer is described below in detail.

That is, a radical-polymerizable monomer is polymerized in the presence of a mercaptan having a thiol group and a carboxyl group such as thioglycollic acid or mercaptopropionic acid to obtain a polymer of 1,000–20,000 in number-average molecular weight having a carboxyl group at one end of the molecule. Then, the polymer is reacted with a monomer having an addition-reactive group such as glycidyl methacrylate or the like to obtain a macromolecular monomer having a methacryloyl group at one end of the molecule.

The polymer or macromolecular monomer obtained by radical polymerization using a mercaptan as a chain transfer agent, however, has had a problem of inferior weatherability, because the polymer or macromolecular monomer contains a thioether bond which is easily deteriorated by ultraviolet rays. Branched-chain polymers containing said macromolecular monomer as a component have had the same problem.

SUMMARY OF INVENTION

The present invention is intended to improve the weatherability of a polymer composed mainly of a (meth)acrylic acid ester monomer or the like and having a thioether bond, obtained by the above process.

The present invention resides in a process for producing a polymer (including a macromolecular monomer) of excellent weatherability, which comprises reacting a polymer having a thioether bond with a peroxide to oxidize the sulfur atom in the thioether bond to convert it into a sulfone.

DETAILED DESCRIPTION OF EMBODIMENTS

As the polymer having a thioether bond used in the present invention, there are cited, for example, a straight-chain or branched-chain polymer of 500–20,000 in number-average molecular weight having a thioether bond, and a branched-chain polymer obtained by copolymerization of a macromolecular monomer having a thioether bond with another monomer.

The first aspect of the present invention is a process for producing a polymer of excellent weatherability, which comprises polymerizing an ethylenically unsaturated monomer in the presence of a mercaptan to obtain a straight-chain or branched chain polymer of 500–20,000 in number-average molecular weight having a thioether bond and then reacting the polymer with a peroxide to oxidize the sulfur atom in the thioether bond to convert it into a sulfone.

The second aspect of the present invention is a process for producing a macromolecular monomer of excellent weatherability, which comprises the following steps [a] to [c]:

[a] a step of polymerizing at least one ethylenically unsaturated monomer in the presence of a mercaptan having a thiol group and a reactive group in the molecule,

[b] a step of reacting the polymer obtained in the step [a], with a peroxide to oxidize the sulfur atom in the thioether bond present in the polymer to convert it into a sulfone, and

[c] a step of reacting the polymer obtained in the step [b], with a compound having a functional group which is addition-reactive with the reactive group present at one end of the polymer, and an ethylenically unsaturated bond, to obtain a macromolecular monomer of excellent weatherability.

The third aspect of the present invention is a process for producing a branched-chain polymer of excellent weatherability, which comprises the following steps [d] to [g]:

[d] a step of polymerizing an ethylenically unsaturated monomer in the presence of a mercaptan having a thiol group and a reactive group in the molecule,

[e] a step of reacting the polymer obtained in the step [d] with a compound having a functional group which is addition-reactive with the reactive group present at one end of the polymer, and an ethylenically unsaturated bond, to obtain a macromolecular monomer,

[f] a step of copolymerizing the macromolecular monomer having an ethylenically unsaturated bond at one end of the molecule, obtained in the step [e] with another monomer to synthesize a branched-chain polymer, and

[g] a step of reacting the branched-chain polymer obtained in the step [f] with a peroxide to oxidize the sulfur atom in the thioether bond present in the branched-chain polymer to convert it into a sulfone.

The present invention is hereinafter described in more detail.

As the mercaptan usable in the first aspect of the present invention, there are cited, for example, butyl mercaptan, hexyl mercaptan, octyl mercaptan, lauryl mercaptan, mercaptoacetic acid, β-mercaptopropionic acid, β-mercaptoethanol, thioglycerol and thiomalic acid.

In the first aspect, the molecular weight of the polymer is 500–20,000 in terms of number-average molecular weight, as mentioned above, and is controlled by the amount of the mercaptan used. That is, the amount of the mercaptan used which corresponds to a polymer of 500 in number-average molecular weight is 50 moles per 100 moles of the total monomers fed, and the mercaptan amount corresponding to a polymer of 20,000 in number-average molecular weight is 0.3 mole per 100 moles of the total monomers fed.

A polymer of more than 20,000 in number-average molecular weight requires, in its production, a very small amount of the mercaptan. In this polymer, therefore, the reduction in weatherability due to thioether bond can be neglected. Hence, such a polymer is excluded from the object of the first aspect.

As the ethylenically unsaturated monomer used in the first aspect, there are cited, for example, (meth)acrylic acid esters such as methyl (meth)acrylate, ethyl (meth)acrylate, butyl (meth)acrylate, isobutyl (meth)acrylate, 2-ethylhexyl (meth)-acrylate, stearyl (meth)acrylate, behenyl (meth)acrylate, isobornyl (meth)acrylate, 2-hydroxyethyl (meth)acrylate, hydroxypropyl (meth)acrylate and the like; unsaturated carboxylic acids such as (meth)acrylic acid, maleic anhydride, itaconic acid and the like; styrene; α-methylstyrene; vinyl acetate; and acrylonitrile. Methacrylic acid esters are preferable in view of the weatherability of the polymer obtained.

As for the polymerization method, solution polymerization is preferable, and a polymerization solvent such as toluene, xylene, methyl isobutyl ketone or the like can be used preferably. As the polymerization initiator, there can be used a radical-generating compound such as azo compound, peroxide compound or the like.

By the above polymerization there can be obtained a polymer of 500–20,000 in number-average molecular weight having a thioether bond derived from the mercaptan, at one end of the molecule.

Then, the polymer is reacted with a peroxide to oxidize the sulfur atom in the thioether bond present in the polymer to convert it into a sulfone.

In the above oxidation, it is possible to use the organic solvent solution obtained in the polymerization, as it is, or to isolate the polymer from said solution, redissolve the polymer in an organic solvent such as methylene chloride, toluene, butyl acetate or the like and use the resulting solution.

As the peroxide, there are cited organic peracids such as perbenzoic acid, m-chloroperbenxoic acid, peracetic acid, perhexanoic acid and the like; hydroperoxides such as tert-butyl hydroperoxide, cumene hydroperoxide and the like; and inorganic peroxides such as hydrogen peroxide, potassium persulfate magnesium monoperoxyphthalate ozone and the like. Organic peracids and inorganic peroxides are preferable, and particularly preferable are m-chloroperbenxoic acid, hydrogen peroxide and ozone.

A catalyst may be used in combination with the peroxide. An example of the preferable catalyst is phosphotungstic acid.

In the oxidation using the peroxide, the sulfur atom in the thioether bond in the polymer to be oxidized is oxidized in two stages. In the first-stage oxidation of the sulfur atom, the thioether bond is converted into a sulfoxide and, in the second-stage oxidation of the sulfur atom, the sulfoxide is converted into a sulfone. As a result of the two-stage oxidation, the polymer obtained has improved weatherability.

It is necessary therefore that the amount of the peroxide used be at least two times in equivalent that of the thioether bond contained in the polymer to be oxidized. When the amount of the peroxide used is less than two times in equivalent, a part of the sulfur atom in the thioether bond is oxidized only in the first-stage (resultantly, a part of the thioether bond is converted only into a sulfoxide and not converted into a sulfone), and the polymer obtained has no sufficient weatherability.

When the peroxide used is powder of an organic peracid (e.g. m-chloroperbenzoic acid), the organic peracid may be added to a solution of the polymer to be oxidized, as it is, or may be added in the form of its solution dissolved in an organic solvent.

When the peroxide used is a water-soluble inorganic peroxide (e.g., hydrogen peroxide), it is preferable that the peroxide be added to a solution of the polymer to be oxidized, in the form of its solution dissolved in water, the two solutions be stirred and efficiently contacted, and then the aqueous layer and the organic layer be separated from each other by centrifugation or the like.

When ozone is used, it is preferable that ozone be blown into a solution of the polymer to be oxidized, to bubble the solution.

The reaction temperature is preferably 0° C. to room temperature when there is used a peroxide of high oxidizing power, such as m-chloroperbenzoic acid, ozone or the like, and about 50°–80° C. when there is used a peroxide of intermediate oxidizing power, such as hydrogen peroxide or the like. The reaction time is 1–20 hours.

The proceeding of the oxidation can be determined by measuring, by $^1$H-NMR, the chemical shift of the hydrogen atoms in the $CH_2$ adjacent to the sulfur atom in the polymer to be oxidized.

The polymer of excellent weatherability obtained in the first aspect can be used in one component air-drying coatings and curing type coatings using a curing agent in combination.

For use in air-drying type coatings, a polymer of 5,000–20,000 in number-average molecular weight is preferable.

For use in curing type coatings, there is preferred a polymer of 500–15,000 in number-average molecular weight having, in the molecule, a functional group such as hydroxyl group, carboxyl group, amino group or the like. As the curing agent used in combination, there are cited polyisocyanate compounds, aminoplast resins, etc.

Next, description is made on the second aspect of the present invention.

In the second aspect directed to a process for producing a macromolecular monomer, there is obtained, in the step [a], a polymer having a reactive group at one end of the molecule, by using, as a chain transfer agent, a mercaptan having a reactive group and a thiol group in the molecule. The polymer preferably has a number-average molecular weight of 1,000–20,000.

Specific examples of the reactive group to be possessed by the mercaptan used in the step [a] are a carboxyl group and a hydroxyl group. As the mercaptan having such a reactive group, there are cited, for example, mercaptoacetic acid, 2-mercaptopropionic acid, 3-mercaptopropionic acid and 2-mercaptoethanol.

The amount of the mercaptan used is preferably 1–30 moles, more preferably 5–20 moles per 100 moles of the total monomers used in the polymerization.

As the monomer used in the step [a], there are cited, for example, methyl (meth)acrylate, ethyl (meth)acrylate, butyl (meth)acrylate, isobutyl (meth)acrylate, tert-butyl (meth)acrylate, 2-ethylhexyl (meth)acrylate, (meth)acrylonitrile, styrene and α-methylstyrene.

As the polymerization method, solution polymerization is preferable. The polymerization solvent, polymerization initiator, etc. used are basically the same as in the first aspect.

In the step [b], the sulfur atom in the thioether bond present in the polymer obtained in the step [a] is oxidized with a peroxide to covert the thioether bond into a sulfone. The oxidation is conducted basically in the same manner as in the first aspect.

In the step [c], the polymer obtained in the step [b] is reacted with a monomer having a functional group addition-reactive with the reactive group in said polymer and an ethylenically unsaturated bond (the monomer is hereinafter referred to as "functional group-containing monomer"), whereby a macromolecular monomer having an ethylenically unsaturated bond at one end of the molecule is obtained.

As the functional group-containing monomer to be reacted with the polymer obtained in the step [b], there are cited, for example, glycidyl methacrylate, glycidyl acrylate, methacrylic acid chloride, p-vinylbenzyl chloride and p-vinylaniline. Of these monomers, preferable are glycidyl methacrylate and glycidyl acrylate.

The reaction between the polymer and the functional group-containing monomer is conducted preferably at an approximately equimolar ratio or at a molar ratio in which the latter is excessive. The reaction can be conducted in an organic solvent, and the reaction temperature is preferably 60–120° C. An appropriate amount of a catalyst may be used if necessary.

By the above process there can be obtained a macromolecular monomer having, as a polymerizable group, an ethylenically unsaturated bond such as acryloyl group, methacryloyl group, vinylbenzyl group or the like.

The resulting macromolecular monomer contains no thioether bond. Hence, for example, by copolymerizing the macromolecular monomer with another monomer, a branched-chain polymer containing no thioether bond can be obtained. The branched-chain polymer has excellent weatherability and can be suitably used in coatings or paints.

Then, description is made on the third aspect of the present invention.

The steps [d] and [e] in the third aspect are the same as the steps [a] and [c] in the second aspect, respectively.

In the step [f], the macromolecular monomer obtained in the step [e] is copolymerized with another monomer to synthesize a branched-chain polymer containing said macromolecular monomers as the side chains. The branching degree of the branched-chain polymer is controlled by the proportions of the macromolecular monomer and the other monomer copolymerized. The higher the proportion of the macromolecular monomers is, the higher the resulting branching degree of the branched-chain polymer becomes.

A polymer of higher branching degree has a larger molecular weight and gives a solution of lower viscosity and therefore is better suited for use in high-solid coatings. The polymer for use in said coatings contains the macromolecular monomer unit in an amount of preferably 40% by weight or more, more preferably 55–99.5% by weight based on the amount of the total constituent units.

The preferable weight-average molecular weight of the branched-chain polymer is 5,000–30,000. When the weight-average molecular eight of the branched-cain polymer is less tan 5,000, the resulting coating is inferior in durability of coating film. When the molecular eight is more than 30,000, the polymer gives a solution of high viscosity, which makes the coatability low.

As the monomer to be copolymerized with the macromolecular monomer, there are cited, for example, alkyl ($C_1$–$C_{18}$) (meth)acrylates, perfluoroaklyl ($C_1$–$C_{18}$) (meth)acrylates, styrene, (meth)acrylonitrile, (meth)acrylic acid, maleic anhydride, 2-hydroxyethyl (meth)acrylate, hydroxypropyl (meth)acrylate, glycidyl (meth)acrylate, N-methylolacrylamide, N,N-dimethylamino ethyl (meth)acrylate and (meth)acryloyloxypropyl-trimethoxysilane. In view of the excellent weatherability of the branched-chain polymer obtained, (meth)acrylic acid esters such as alkyl (meth)acrylates, hydroxyalkyl (meth)acrylates and the like are preferable, and alkyl (meth)acrylates such as methyl (meth)acrylate, butyl (meth)acrylate, 2-ethylhexyl (meth)acrylate and the like are particularly preferable.

In the preferable constitution of the branched-chain polymer, the amount of the alkyl (meth)acrylate monomer unit is 60–80% by weight based on the total amount of (1) the monomer units constituting the macromolecular monomer and (2) the unit of the above monomer copolymerized with the macromolecular monomer.

As the polymerization method, solution polymerization is preferable. In the polymerization, there can be used a polymerization solvent such as toluene, xylene, methyl ethyl ketone, methyl isobutyl ketone or the like.

As the polymerization initiator, there is preferred an azo compound such as 2,2-azobisisobutyronitrile or the like, or an organic peroxide such as benzoyl peroxide or the like. The preferable amount of the initiator used is 1–10 moles per 100 moles of the total of the macromolecular monomer and the monomer copolymerized therewith, and is 1–3 moles when the following chain transfer agent is used in combination.

In the step [f], it is preferable that a chain transfer agent such as dodecyl mercaptan, mercaptoethanol, thioglycollic acid or the like be used. The preferable amount of the chain transfer agent used is 2–15 moles per 100 moles of the total of the macromolecular monomer and the monomer copolymerized therewith.

In the next step [g] the branched-chain polymer obtained in the step [f] is reacted with a peroxide in the same manner as in the step [b] of the second aspect to oxidize the thioether bond in the polymer, whereby a branched-chain polymer of excellent weatherability is obtained.

The branched-chain polymer thus obtained gives a resin solution of high solid content and yet low viscosity. Moreover, the polymer has excellent weatherability. Hence, it can be very suitably used as a resin or coatings.

The branched-chain poller can be used in air-drying type coatings. Also, when the poller contains a crosslinkable functional group such as carboxyl group, hydroxyl group or the like, it can be used in heat-curing type coatings by using, in combination, a crosslinking agent such as aminoplast resin, polyisocyanate compound or the like. The heat-curing type coating obtained by the present invention is particularly suitable as a coating for automobiles.

The present invention is hereinafter described specifically by way of Examples and Comparative Examples. Incidentally, the weatherability of each poller obtained in each Example or Comparative Example was evaluated by the following method.

Each of the pollers obtained was made into a toluene solution containing 30% of the polymer. The solution was coated on a glass plate using a bar coater and dried. The resulting film was forcibly deteriorated at 83° C. for 220 hours with no water sprayed, using a sunshine weatherometer (hereinafter referred to as SWOM). The coloring of the film after the above test was examined visually.

EXAMPLE 1

106 parts by weight of toluene was fed into a flask equipped with a stirrer, a reflux condenser, a dropping funnel, a thermometer and a nitrogen-inlet tube. The toluene temperature was kept at 80°–85° C. with nitrogen gas being introduced into toluene.

From the dropping funnel was continuously dropped, in 3 hours, a mixture consisting of 10 parts by weight of 2-hydroxyethyl methacrylate, 45 parts by weight of butyl methacrylate, 10 parts by weight of styrene, 24 parts by weight of ethyl acrylate, 5 parts by weight of methacrylic acid, 6 parts by weight of mercaptoacetic acid and 2 parts by weight of azobisisobyronitrile (hereinafter referred to as AIBN). After the completion of the dropping, the same temperature was kept for 2 hours and stirring was continued. Then, the polymerization reaction was completed.

After the polymerization, the average conversion of the monomers used was measured by gas chromatography to get 98%. The molecular weight of the polymer obtained was measured by gel permeation chromatography on the basis of calibration with polystyrene standard (hereinafter referred to as GPC) to get 1,500 in terms of number-average molecular weight and 3,000 in terms of weight-average molecular weight.

The polymer solution in toluene was added to an aqueous methanol solution to precipitate the polymer. The polymer was separated and then vacuum-dried at 40° C. to obtain a polymer A having slight stickiness.

10 parts by weight of the polymer A was dissolved in 100 parts by weight of methylene chloride. The resulting solution was kept at 0° C. Thereto was added 8 parts by weight of m-chloroperbenzoic acid (purity =80%). The mixture was subjected to oxidation reaction for 1 hour with stirring.

The relationship between the amount of the thioether bond in the polymer and the amount of the peroxide used was as follows.

Amount of thioether bond in polymer: 0.0064 mole

Amount of peroxide used: 0.037 mole

Ratio of peroxide to thioether bond: 5.8 times in equivalent

The reaction mixture was washed with 200 parts by weight of 10% aqueous sodium hydrogencarbonate solution to remove the residual peroxide, after which methylene chloride was evaporated to obtain an oxidized polymer.

The polymer was made into a 30% toluene solution. A coating film was formed using the solution and evaluated for weatherability using SWOM. As a result the film was only slightly colored in yellow after 220 hours and had excellent weatherability.

EXAMPLE 2

10 parts by weight of the polymer A obtained in Example 1 was dissolved in 100 parts by weight of toluene. To the solution was added 5 parts by weight of m-chloroperbenzoic acid (purity =80%), and the mixture was subjected to oxidation reaction at 20° C. for 5 hours. The amount of the peroxide used was 3.6 times in equivalent that of the thioether bond in the polymer.

From the resulting polymer was formed a coating film in the same manner as in Example 1. The film was evaluated for weatherability. As a result, the film was only slightly colored in yellow and had excellent weatherability.

Comparative Example 1

The polymer A obtained in Example 1 was evaluated for weatherability as it was, without being oxidized. As a result, the film prepared from the polymer A was colored in brown.

Comparative Example 2

The polymer A and m-chloroperbenzoic acid were reacted in the following proportions.

Amount of thioether bond in polymer: 0.0064 mole

Amount of peroxide used: 0.0093 mole

Ratio of peroxide to thioether bond: 1.5 times in equivalent

From the resulting polymer was formed a coating film. The film was evaluated for weatherability. As a result, the film was colored in brown.

In Comparative Example 2, the amount of m-chloroperbenzoic acid used was short. Hence, the sulfur atom in the thioether bond in the polymer A was not completely oxidized and the thioether bond was not sufficiently converted into a sulfone. As a result, the resulting polymer had insufficient weatherability. As clear from this Comparative Example, a polymer having a thioether bond or a sulfoxide group has insufficient weatherability.

EXAMPLE 3

To a mixed solvent consisting of 50 parts by weight of butanol and 56 parts by weight of xylene was dropwise added, in the same manner as in Example 1, a mixture consisting of 10 parts by weight of 2hydroxyethyl methacrylate, 45 parts by weight of butyl methacrylate, 10 parts by weight of methacrylic acid, 20 parts by weight of styrene, 14 parts by weight of ethyl acrylate, 1 part by weight of mercaptoethanol and 2 parts by weight of AIBN, to conduct polymerization reaction.

By the above polymerization reaction was obtained a polymer B having a number-average molecular weight of 7,700 and a weight-average molecular weight of 16,400 as measured by GPC.

10 parts by weight of the polymer B was dissolved in 100 parts by weight of methylene chloride. The solution was kept at 0° C. Thereto was added 8 parts by weight of m-chloroperbenzoic acid (purity =80%). The mixture was subjected to oxidation reaction for 1 hour with stirring.

Amount of thioether bond in polymer: 0.0012 mole

Amount of peroxide used: 0.0093 mole

Ratio of peroxide to thioether bond: 7.V times in equivalent

From the resulting polymer was formed a coating film. The film was evaluated for weatherability. As a result, the film was nearly colorless and had excellent weatherability.

Comparative Example 3

The polymer B obtained in Example 3 was evaluated for weatherability as it was, without being oxidized. As a result, the film prepared from the polymer B was colored in yellow.

EXAMPLE 4

[Synthesis of macromolecular monomer]

106.2 parts by weight of toluene was fed into a flask equipped with a stirrer, a reflux condenser, a dropping funnel, a thermometer and a nitrogen-inlet tube. The toluene temperature was kept at 80°–85° C. by stirring, with nitrogen gas being introduced into toluene.

From the dropping funnel was continuously dropped, in 3 hours, a mixture consisting of 100 parts by weight of methyl methacrylate, 10.6 parts by weight of mercaptoacetic acid and 2 parts by weight of AIBN, to react them. After the completion of the dropping, the reaction was continued further for 2 hours to obtain a toluene solution of polymethyl methacrylate having a carboxyl group at one end of the molecule.

The polymer had a number-average molecular weight of 1,500 and a weight-average molecular weight of 3,000. The amount of carboxyl group in the polymer was 37 mgKOH/g of polymer.

10 parts by weight of the polymer was dissolved in 100 parts by weight of methylene chloride. To the solution was added 8 parts by weight of m-chloroperbenzoic acid. The mixture was subjected to reaction at 0° C. for 1 hour. The reaction mixture was subjected to the same procedure after oxidation reaction as in Example 1, to separate an oxidized polymer from the reaction mixture.

The resulting polymer was reacted with glycidyl methacrylate in toluene. Glycidyl methacrylate was used in an amount of about 1.1 times in equivalent that of the carboxyl group in the polymer. The reaction was conducted in the presence of hydroquinone monomethyl ether as a polymerization inhibitor and a quaternary ammonium salt as a catalyst, at 90° C. for 6 hours.

After the reaction, the resulting polymer as measured for acid value, which indicated that the degree of conversion was 98.5%.

By the above reaction was obtained a macromolecular monomer having a methacryloyl group at one end of the molecule.

[Synthesis of branched-chain polymer]

The above-obtained macromolecular monomer, styrene and methyl methacrylate were used at a weight ratio of 45:25:30. There was also used 8.4 mole %, based on the total moles of the above polymerizable components, of AIBN as a polymerization initiator. They were subjected to polymerization reaction in toluene at 60° C. for 8 hours.

The resulting polymer had a number-average molecular weight of 7,000 and a weight-average molecular weight of 14,000 as measured by GPC.

The polymer was evaluated for weatherability. As a result, the film of the polymer gave no yellowing.

Comparative Example 4

Methyl methacrylate was polymerized in the same manner as in the step of [Synthesis of macromolecular monomer] of Example 4, to obtain a polymethyl methacrylate (number-average molecular weight =1,500, weight-average molecular weight =3,000) having a carboxyl group at one end of the molecule. The polymethyl methyl methacrylate was reacted with glycidyl methacrylate as it was, without being oxidized, whereby a macromolecular monomer as synthesized.

The macromolecular monomer, styrene and methyl methacrylate were copolymerized in the same manner as in Example 4 to obtain a branched-chain poller having number-average molecular weight of 7,000 and a weight-average molecular eight of 14,000. The polymer was evaluated for weatherability. As a result, the film of the polymer was colored in brown.

EXAMPLE 5

The branched-chain polymer obtained in Comparative Example 4 (a branched-chain polymer obtained by copolymerizing a polymethyl methacrylate type macromolecular monomer, styrene and methyl methacrylate at a weight ratio of 45:25:30) was oxidized with a peroxide as follows.

24 parts by weight of the branched-chain polymer was dissolved in 300 parts by weight of methylene chloride. To the solution was added 14 parts by weight of m-chloroperbenzoic acid. The mixture was subjected to oxidation reaction at 0° C. for 1 hour. Then, the oxidized branched-chain polymer was separated from the reaction mixture.

The branched-chain polymer was evaluated for weatherability. As a result, the film of the polymer gave no yellowing.

EXAMPLE 6

A branched-chain polymer was produced by using a macromolecular monomer of 1,340 in number-average molecular weight and 2,600 in weight-average molecular weight, having a composition of methyl methacrylate/2-hydroxyethyl methacrylate =80/20 (by weight %) and having a methacryloyl group at one end of the molecule.

The above-mentioned macromolecular monomer, styrene and methyl methacrylate were used at a weight ratio of 70:18:12. There was also used 8.4 mole %, based on the total moles of the above polymerizable components, of AIBN as a polymerization initiator. They were subjected to polymerization reaction in toluene at 60° C. for 8 hours.

The resulting branched-chain polymer was made into a toluene solution containing 20% by weight of the polymer. To 50 parts by weight of the solution (containing 10 parts by weight of the polymer; the amount of sulfur atom contained in the polymer =8.05 mM) was added 15 parts by weight of m-chloroperbenzoic acid (purity =80%) (the amount of m-chloroperbenzoic acid =69.5 mM), and the mixture was subjected to reaction at 20° C. for 3 hours.

In the course of the reaction, the amount of the peroxide in the reaction mixture was determined by iodometry. When the amount became constant, the reaction was stopped. The subsequent procedure was carried out similarly to the above Examples to remove the residual peroxide and obtain a branched-chain polymer after oxidation treatment.

The polymer was measured for (1) weight-average molecular weight by small-angle light-scattering photometry and (2) solution viscosity (viscosity of acetone solution containing 40% by weight of a polymer, at 25° C. as measured using Ubbellohde viscometer; this applies to the solution viscosity of Example 9). The results were as follows.

Mw: 23,100

η: 13.2 (cp)

The polymer was also evaluated for weatherability. As a result, the film of the polymer gave no yellowing.

EXAMPLE 7

The branched-chain polymer obtained by the polymerization of Example 6 was oxidized with hydrogen peroxide.

To 50 parts by weight of a toluene solution containing 20% by weight of the above polymer (containing 10 parts by weight of the polymer; the amount of sulfur atom contained in the polymer =8.05 mM) was added 4.86 parts by weight of an aqueous hydrogen peroxide solution (35% concentration) (50.08 M). The mixture was subjectd to reaction at 60° C. for 16 hours. In the course of the reaction, the amount of hydrogen peroxide in the reaction mixture was determined by iodometry. When the amount became constant, the reaction was stopped.

A polymer after oxidation treatment was separated from the reaction mixture and evaluated for weatherability. As a result, the film of the polymer gave no yellowing.

EXAMPLE 8

The same procedure as in Example 7 was repeated except that 0.058 parts by weight of phosphotungstic acid was used as a catalyst in the oxidation reaction. The oxidation reaction was finished in 8 hours.

The polymer after oxidation was evaluated for weatherability. The result was good similarly to that in Example 7.

EXAMPLE 9

93% by weight of the macromolecular monomer synthesized in Example 6 and 7% by weight of styrene were copolymerized as follows.

The above two components were reacted in toluene at 60° C. for 8 hours using AIBN as a polymerization initiator and lauryl mercaptan as a chain transfer agent in amounts of 8.4 mole % and 7.5 mole %, respectively, based on the total moles of the two components.

10 parts by weight of the resulting polymer (the amount of sulfur atom in the polymer =10.7 mM) and 92.7 mM of m-chloroperbenzoic acid were subjected to oxidation reaction in the same manner as in Example 6.

The resulting polymer had the following weight-average molecular weight and solution viscosity.

Mw: 19,000

η: 11.4 (cp)

The polymer was also evaluated for weatherability. As a result, the film of the polymer gave no yellowing and had good weatherability.

What is claimed is:

1. A solvent-based coating composition containing a polymer of excellent weatherability obtained by the process of polymerizing an ethylenically unsaturated monomer in the presence of a mercaptan having a thiol group and a reactive group in the molecule to obtain a polymer, wherein said mercaptan is selected from the group consisting of mercaptoacetic acid, 2-mercaptopropionic acid, 3-mercaptopropionic acid and 2-mercaptoethanol reacting said polymer with a compound having a functional group which is addition-reactive with a reactive group present at one end of said polymer, and an ethylenically unsaturated bond, to obtain a macromolecular monomer having an ethylenically unsaturated bond at one end wherein said compound having a functional group and an ethylenically unsaturated bond is selected from the group consisting of glycidyl methacrylate, glycidyl acrylate, methacrylic acid chloride, p-vinylbenzyl chloride and p-vinylaniline, copolymerizing said macromolecular monomer with another monomer to synthesize a branched-chain polymer, said macromolecular monomer being present in said branched-chain polymer in an amount of 55–99.5% by weight based on the weight of said branched-chain polymer, wherein said another monomer is selected from the group consisting of alkyl ($C_1$–$C_{18}$) (meth)acrylates, perfluoroalkyl ($C_1$–$C_{18}$) (meth)acrylates, styrene, (meth)acrylonitrile, (meth)acrylic acid, maleic anhydride, 2-hydroxyethyl (meth)acrylate, hydroxypropyl (meth)acrylate, glycidyl (meth)acrylate, N-methylolacrylamide, N,N-dimethylamino ethyl (meth)acrylate and (meth) acryloyloxypropyl-trimethoxysilane, and reacting said branched-chain polymer with a peroxide to oxidize the sulfur atom in the thioether bond present in the branched-chain polymer to form a sulfone, and wherein said polymer has a number-average molecular weight of 500–25,000.

2. A composition according to claim 1, wherein the ethylenically unsaturated monomer is selected from the group consisting of methyl (meth)acrylate, ethyl (meth)acrylate, butyl (meth)acrylate, isobutyl (meth)acrylate, tert-butyl (meth)acrylate, 2-ethylhexyl (meth)acrylate, (meth)acrylonitrile, styrene and α-methylstyrene.

3. A composition according to claim 1, wherein the peroxide is selected from the group consisting of perbenzoic acid, m-chloroperbenzoic acid, peracetic acid, perhexanoic acid, tert-butyl hydroperoxide, cumene hydroperoxide, hydrogen peroxide, potassium persulfate, oxone, magnesium monoperoxyphthalate and ozone and the peroxide is used in an amount of at least 2 times in equivalent that of the thioether bond contained in the polymer to be oxidized.

* * * * *